United States Patent
Bedford

(10) Patent No.: US 7,025,352 B2
(45) Date of Patent: Apr. 11, 2006

(54) GAME WITH MULTIPLE CHAMBERS

(75) Inventor: Jonathan Bedford, Hawthorne, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 10/286,365

(22) Filed: Nov. 1, 2002

(65) Prior Publication Data

US 2003/0090062 A1 May 15, 2003

Related U.S. Application Data

(60) Provisional application No. 60/340,007, filed on Nov. 1, 2001.

(51) Int. Cl.
A63F 3/00 (2006.01)

(52) U.S. Cl. .................... 273/243; 273/248

(58) Field of Classification Search ............... 273/243, 273/285, 287, 138.1, 139, 248
See application file for complete search history.

(56) References Cited

U.S. PATENT DOCUMENTS

| | | | |
|---|---|---|---|
| 565,450 A | 8/1896 | Gibson | |
| 990,918 A | 5/1911 | Stadler | |
| 1,430,778 A | 10/1922 | Williams | |
| 1,549,610 A | 8/1925 | Reisz | |
| 1,819,932 A | 8/1931 | Walden | |
| 1,870,395 A | 8/1932 | Zarin | |
| 1,992,618 A | 2/1935 | Jeffreys | |
| 3,767,201 A | 10/1973 | Harper et al. | |
| 3,804,416 A | 4/1974 | Jones et al. | |
| 4,003,577 A * | 1/1977 | Bolach | 273/243 |
| 4,046,381 A | 9/1977 | Comeaux | |
| 4,130,284 A | 12/1978 | Fuks | |
| 4,333,654 A | 6/1982 | Allain | |
| 4,349,973 A | 9/1982 | Penick et al. | |
| 4,497,490 A | 2/1985 | Rogers, Jr. | |
| 4,534,565 A | 8/1985 | Hube | |
| 4,585,233 A | 4/1986 | Wilson | |
| 4,648,601 A | 3/1987 | Carmichael | |
| 4,781,384 A | 11/1988 | Bois | |
| 4,861,040 A | 8/1989 | Peterson | |
| 5,022,681 A | 6/1991 | Penick | |
| 5,049,078 A | 9/1991 | Thomsen | |
| 5,071,134 A * | 12/1991 | Burroughs, Jr. | 273/249 |
| 5,096,204 A | 3/1992 | Lippman | |
| 5,195,750 A | 3/1993 | Courialis | |
| 5,213,507 A | 5/1993 | Ozrovitz | |
| 5,228,698 A | 7/1993 | Dubarry, Jr. | |
| 5,342,059 A * | 8/1994 | Briem et al. | 273/277 |
| 5,358,252 A | 10/1994 | McPhaul | |
| 5,415,412 A | 5/1995 | McMahon | |
| 5,443,268 A | 8/1995 | Mayfield et al. | |
| 5,511,792 A | 4/1996 | Simmons et al. | |
| 5,562,520 A | 10/1996 | Pridonoff et al. | |

(Continued)

OTHER PUBLICATIONS

Ex.Parte Breslow 192 USPQ 431.*

*Primary Examiner*—Vishu K. Mendiratta
(74) *Attorney, Agent, or Firm*—Kolisch Hartwell, P.C.

(57) ABSTRACT

A game wherein players move their game pieces around a pathway through multiple chambers is described. Moreover, the game may be portable. In some cases, the game apparatus may be carried in a plastic case that resembles a hard-backed book. The game components may be based on an individual chapter from a published children's book or novel.

15 Claims, 2 Drawing Sheets

U.S. PATENT DOCUMENTS

| | | |
|---|---|---|
| 5,678,819 A | 10/1997 | Underwood |
| 5,681,199 A | 10/1997 | Morris |
| 5,682,999 A | 11/1997 | Larson |
| 5,704,611 A | 1/1998 | Pierce |
| 5,941,525 A * | 8/1999 | Gallub ........................ 273/248 |
| 6,120,029 A | 9/2000 | Carmichael et al. |
| 6,170,825 B1 | 1/2001 | Pflum |
| 6,203,017 B1 | 3/2001 | Schultz |

* cited by examiner

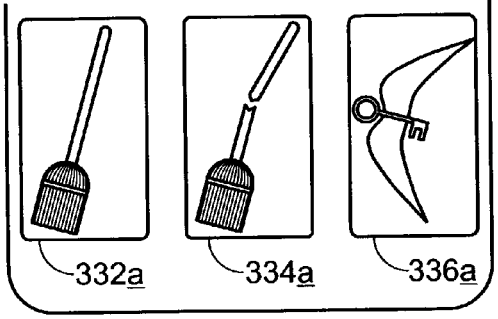
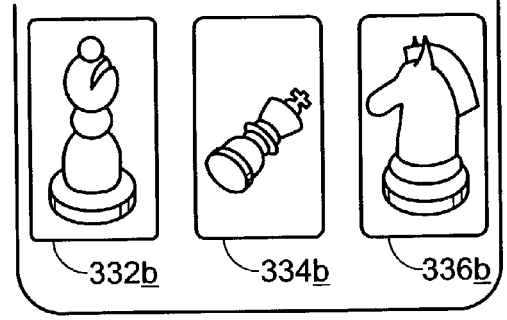
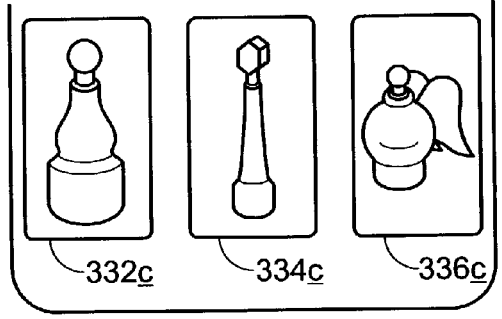
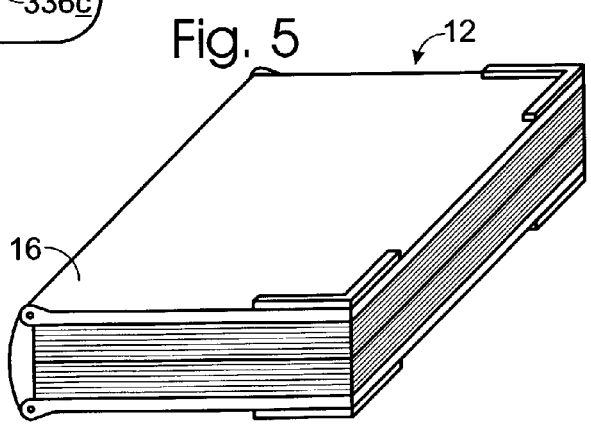

GAME WITH MULTIPLE CHAMBERS

CROSS-REFERENCE TO RELATED APPLICATIONS

This application is based upon and claims priority under 35 U.S.C. § 119(e) to the following U.S. provisional patent application, which is incorporated herein by reference in its entirety for all purposes: Ser. No. 60/340,007 entitled "Book Based Games," filed Nov. 1, 2001.

FIELD OF THE INVENTION

The present invention relates generally to board games, and more specifically to board games that resemble a book when closed, and resemble a children's playset when open. The invention also includes various rules and apparatus for playing a board game, including games having differently configured room-like portions.

BACKGROUND OF THE INVENTION

Examples of board games that resemble a book are disclosed in U.S. Pat. Nos. 2,221,267, 3,880,429, 4,712,673, 4,781,384, 5,356,155, 5,961,149, and 6,203,017, and examples of board games that include multiple levels or room-like portions are disclosed in U.S. Pat. Nos. 3,767,201, 3,804,416, 4,333,654, 4,534,565, 5,195,750, 5,443,268, 5,678,819 and 6,170,825, the disclosures of all of which are incorporated by reference in their entirety for all purposes.

SUMMARY OF THE INVENTION

The present invention includes portable games carried in a plastic case that resembles a hard-backed book. Opening the book unfolds the game board. Various embodiments may be based on an individual chapter from a published children's book or novel.

Preferably, the housing and gameboard double as a play-set, for use with detailed figures and environments.

The present invention further includes rules and apparatus for playing a board game in which players move their player movers through multiple chambers trying to avoid traps and snares that send the players' player movers back to the starting space for each chamber.

The advantages of the present invention will be understood more readily after a consideration of the drawings and the Detailed Description.

BRIEF DESCRIPTION OF THE DRAWINGS

FIGS. 2–4 depict cards suitable for use with the game of FIG. 1.

FIG. 5 is an isolated view of the housing of FIG. 1 in a closed position.

DETAILED DESCRIPTION AND BEST MODE OF THE INVENTION

Figure 1:
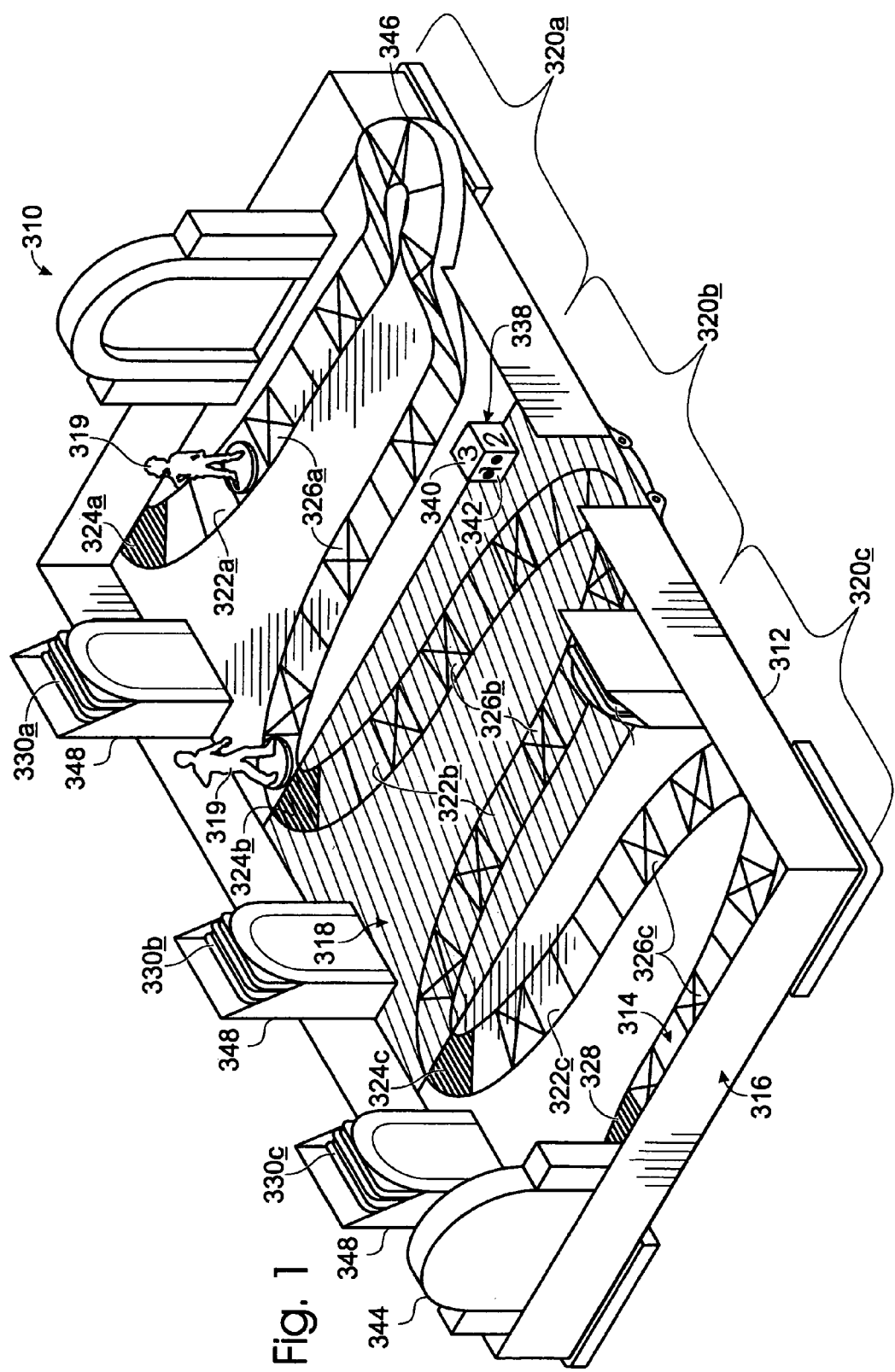
FIG. 1 depicts one embodiment of the game of the present invention, including a housing, multiple chambered playing surface, and playing pieces.

The present invention is a game played by at least two players involving strategy and chance. As will be understood, game 310 may incorporate elements from a particular theme or popular cultural phenomenon, such as a book or movie. In such a case, the elements of game 310 may include depictions, shapes, and colors that reflect or exemplify this theme or phenomenon. In particular, game 310 may be based on a particular portion of popular media, such as a chapter of a book or novel.

An exemplary embodiment of game 310 is shown in FIG. 1. Typically, game 310 includes a housing 312 having an inner surface 314 and an outer surface 316. A game board 318 is located on inner surface 314. Game 310 further includes player movers 319.

As shown, game board 318 may include a plurality of chambers 320 such as first chamber 320a, second chamber 320b, and third chamber 320c. Focusing for the moment on first chamber 320a, it can be seen that path 322a includes a start space 324a and a number of snare spaces 326a, which are typically marked with some type of differentiable indicia. Likewise, second chamber 320b includes a path 322b having a start space 324b and a number of snare spaces 326b, while third chamber 320c includes a path 322c having a start space 324c and a number of snare spaces 326c. Typically, path 322 terminates in a finish space 328.

Game 310 includes a set of cards 330 for each chamber. Thus, card set 330a is associated with chamber 320a, card set 330b is associated with chamber 320b and card set 330c is associated with chamber 320c. FIGS. 2, 3 and 4 show exemplary cards that may included in card sets 330a, 330b and 330c, respectively. As shown, each card set includes three types of cards: safe cards 332, danger cards 334, and exchange cards 336, with each type of card being differentiable by its words or markings.

Game 310 may further include dice 338. Dice 338 may include both movement indicia 340 (indicated as numbers) and draw card indicia 342 (indicated as dots).

As stated above, game 310 may be based on a particular piece of popular media such as a book or more. More particularly, game 310 may be based on a portion of the popular media piece such as a book chapter. In such a case, it may be desirable for game 310 to also be used as a play set. As a play set, game 310 may include play items based on those items and situations described in the book or other form of popular media. Furthermore, game 310 may include additional decorative items that are not used in game play according to the rules of the game. In addition, some or all of the items used in game play may be suitable for use as part of the play set.

As stated above, game 310 may further include a housing 312 having an inner surface 314 and an outer surface 316. Typically, housing 312 is adapted to move from an open position, as shown in FIG. 1 to a closed position, as shown in FIG. 5. Generally, game board 318 is accessible for play when the housing is in the open position. The housing may resemble a book when in the closed position. Furthermore, when in the closed position, the housing may be adapted to contain all of the playing components including the playing pieces and any decorative items not used in game play.

In one embodiment, the present invention provides rules for using the above-described apparatus wherein players attempt to maneuver their movers across game board 318 from start space 324a to finish space 328. Typically, players roll dice 338 and, if movement indicia 340 is rolled, move their player movers along path 322a, 322b, or 322c the number of spaces indicated by the dice. If a player mover lands on a snare space, the player mover must return to the start space corresponding to the chamber in which the player mover is currently located. Alternatively, if draw card indicia 342 is rolled, a player may draw a card corresponding to the chamber in which the player's player mover is currently located. If a safe card 332 is drawn, the player may save the card and play it the next time the player's player mover lands on a snare space. Playing the safe card enables the player to avoid moving his player mover to a start space when the player mover lands on a snare space. If a danger card 334 is drawn, the player's player mover is returned to the start space corresponding to the chamber in which the player mover is currently located. If an exchange card 336 is drawn, the player may exchange the positions of two of the player movers.

As stated above, the game may be based on a well-known popular culture phenomenon, such as a book or movie. Accordingly, the example below is based on the popular children's book *Harry Potter and the Sorcerer's Stone*, by J. K. Rowlings. Accordingly, an example of a set of rules for a game constructed in accordance with an embodiment of the present invention follows:

EXAMPLE I

Harry Potter and the Sorcerer's Stone ™
THROUGH THE TRAPDOOR
Chapter Game
CONTENTS

| | |
|---|---|
| 1 | Mini Game Book (Housing 312) |
| 2 | Harry Potter Player Movers 316 |
| 15 | Skill Cards 330a, 330b, 330c |
| 1 | Six-Sided Custom Die 340 |
| 4 | Chess Pieces (not shown) |
| 3 | Card Holders 348 |
| 1 | Final Chamber Door Piece 344 |
| 1 | Fluffy Piece (not shown) |
| 1 | Flying Keys Path Piece 346 |
| 1 | Potion Bottles Table (not shown) |
| 3 | Customer Applied Labels: Fluffy, Final Door & Flying Keys Path (not shown) |

Set Up
1. Apply the appropriate label to the following game pieces: Fluffy, Final Door & Flying Keys Path.
2. Attach the following 4 game pieces to their appropriate sections on the side of the game board: A. Flying Keys Path, B. Fluffy, C. Potion Bottles Table, D. Final Chamber Door.
3. Divide the Skill Cards 330 into three sets of five, one set for each Chamber 320. The Card colors are as follows: Flying Keys Chamber 320a—Purple (i.e. set 330a), Chess Game Chamber 320b—Red (i.e. set 330b) and Potion Chamber 320c—Green (i.e. set 330c).
4. Insert each set (330a, b or c) of Skill Cards 330 into one of the 3 cardholders 348. Then attach each holder onto the side of the game board, one for each Chamber 320.
5. Place the 4 chess pieces randomly (off the game path) in the Chess Game Chamber 320b. These are not used in game play.
6. Select a Harry Player Mover 319 and place it on the start space 324a.
7. Roll the die 340, player with the highest roll goes first.

Object
Be the first player to successfully negotiate the Chambers 320 and reach the Final Door leading to the Sorcerer's Stone™ (i.e. end space 328).

Quick Play Notes

The Die 340
This game contains a custom die 340. The faces with the numbers "1" and "6" also include dots 342. If you roll:
1-dot—Take a Skill Card 330a, b, or c from whichever Chamber 320 you happen to be in.
6-dot—Take a Skill Card 330a, b, or c or move 6 spaces.

The Gameboard 318
Players can share the same space on paths 322a, b, and c. Paths in each Chamber are indicated as follows:
Flying Keys Chamber (320a): each space on the path 322a is represented with a broom, and a broken broom indicates a "Snare" space 326a (for simplicity, broom indicia are not individually shown in FIG. 1).
Chess Game Chamber (320b): each space on the path 322b is represented with a tile of a chess board, and a broken tile indicates a "Snare" space 326b (for simplicity, tile indicia are not individually shown in FIG. 1).
Potion Chamber 320c: each space on the path 322c is represented with a rock, and a broken rock indicates a "Snare" space 326c (for simplicity, rock indicia are not individually shown in FIG. 1).
If your Player Mover lands on a "Snare" space 326a, b or c, return to the start space 332a, b, or c of that Chamber. (See below under "Skill Card Symbols & Snare Spaces" for more details.)
If your Player Mover lands on a "Snare" space 326a, b or c but you have a "Safe" card 332a, b, or c from that chamber; play your "Safe" card, move your Player Mover ahead 1 space, and return the card to the rear of the deck. (See below under "Skill Card Symbols & Snare Spaces" for more details.)

Skill Cards
Each Chamber 330 has its own set of five Skill Cards 330. Each Skill Card has a symbol which indicates that the Skill Card is either a "Safe" card 332, a "Danger" card 334, or an "Exchange" card 336 (see below under "Skill Card Symbols & Snare Spaces" for more details).
After you have played any Skill Card 330, place it into the rear of the deck.
After you have passed through a Chamber 320, place all Skill Cards 330 that you have collected from that Chamber back into the rear of the deck.
If you pick a Skill Card 330 and get swapped into another Chamber 320, return all your Skill Cards to the cardholder from your Chamber of origin.

Let's Play
The Following Rules Apply to Each Chamber:
1. Select a Harry Player Mover 320 and place it on the "Start" space 324a.
2. Player with the highest roll goes first.
3. Roll the die 340 and move your Player Mover forward (i.e., toward end space 328) the corresponding number of spaces, following the game path.
4. If you land on a "Snare" space 326a, b or c, move your Player Mover back to the first space in that particular Chamber (i.e. space 324a, b, or c). That is unless you have a "Safe" card 332a, b or c, in which case you move your player mover forward one space and place the card back in the rear of the appropriate deck.
5. If you roll a 1-dot, take a Skill Card 330 and follow the instructions that pertain to each Chamber 320, as explained below.
6. If you roll a 6-dot, take a Skill Card 330 (as above) or move 6 spaces.
7. The first player to successfully pass trough all Chambers 320 and reach the Final Chamber Door (space 328) is the winner. You don't have to reach the Final Chamber Door by exact count.

Skill Card Symbols & Snare Spaces For Each Chamber

Flying Keys Chamber 320a: Cards

"Exchange" card 336a—indicated by a Flying Key symbol

Play immediately

Effect: Exchange your player mover's position with your opponent's

"Danger" card 334a—indicated by a Broken Broom symbol

Play immediately

Effect: Move your player mover to the Flying Key Chamber start space 324a

"Safe" card 332a—indicated by a Non-Broken Broom symbol

Play when your player mover lands on a "Snare" space 326a

Effect: Move your player mover forward one space instead of moving to the Flying Key Chamber start space 324a "Snare" spaces in the Flying Keys Chamber 320a are indicated with a broken broom. If your player mover lands on a "Snare" space, move it to the Flying Key Chamber start space 324a unless you have a "Safe" card 332a to play.

Chess Game Chamber 320b: Cards

"Exchange" card 336b—indicated by an upright Knight chess piece symbol

Play immediately

Effect: Exchange your player mover's position with your opponent's

"Danger" card 334b—indicated by a fallen King chess piece symbol

Play immediately

Effect: Move your player mover to the Chess Game Chamber start space 324b

"Safe" card 332b—indicated by an upright Bishop chess piece symbol

Play when your player mover lands on a "Snare" space 326b

Effect: Move your player mover forward one space instead of moving to the Chess Game Chamber start space 324b.

"Snare" spaces in the Chess Game Chamber 320b are indicated with a broken tile. If your player mover lands on a "Snare" space, move it to the Chess Game Chamber start space 324b unless you have a "Safe" card 332b to play.

Potion Chamber 320c: Cards

"Exchange" card 336c—indicated by a Winged Round Bottle symbol

Play immediately

Effect: Exchange your player mover's position with your opponent's

"Danger" card 334c—indicated by a Thin Bottle symbol

Play immediately

Effect: Move your player mover to the Potion Chamber start space 324c

"Safe" card 332c—indicated by a Curved Bottle symbol

Play when your player mover lands on a "Snare" space 326c

Effect: Move your player mover forward one space instead of moving to the Potion Chamber start space 324c.

"Snare" spaces in the Potion Chamber 320b are indicated with a broken rock. If your player mover lands on a "Snare" space, move it to the Potion Chamber start space 324c unless you have a "Safe" card 332c to play.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

Inventions embodied in various combinations and subcombinations of features, functions, elements and/or properties may be claimed in this or a related application. Such claims, whether they are directed to a different invention or directed to the same invention, whether different, broader, narrower or equal in scope to any original claims, are also regarded as included within the subject matter of the inventions of the present disclosure.

What is claimed is:

1. A method of playing a game comprising:
providing a game board including a plurality of chambers;
providing a pathway beginning in a first chamber and ending in a second chamber, the pathway being comprised of a plurality of spaces;
providing a start space for each chamber;
providing a plurality of snare spaces for each chamber;
providing a differentiable set of chamber-specific skill cards for each chamber;
providing a player mover for each player;
providing a die that includes movement indicia indicating a number of spaces the player mover may move and card indicia indicating that a skill card may be drawn;
moving a player mover along the pathway by:
rolling the die; and
if movement indicia is rolled;
moving the player mover the number of spaces indicated by the die;
determining a type of space landed on by the player mover; and
performing an action required by the type of space landed on by the player mover, if any; or
if card indicia is rolled;
drawing a chamber-specific skill card correlating to the chamber within which the player mover is located;
determining the type of card drawn; and
performing an action required by the type of card drawn.

2. The method of claim 1, further comprising, when a player mover lands on a snare space, returning the player mover to the start space of the chamber where the snare space was located.

3. The method of claim 1 wherein one of the types of chamber-specific cards is an exchange card, the method further comprising:
providing at least two player movers, each player mover having a place on the path; and
exchanging the places of the two player movers if the exchange card is drawn.

4. The method of claim 1 wherein one of the types of chamber-specific cards is a danger card, the method further comprising returning a player mover to the start space corresponding to the chamber with which the chamber-specific card is identified if the danger card is drawn.

5. The method of claim 1 wherein one of the types of chamber-specific cards is a safe card, the method further comprising taking no action when a player mover lands on a snare space if a safe card corresponding to the chamber in which the snare space is located is in the possession of the player controlling the player mover that landed on the snare space.

6. The method of claim 1 further comprising collecting and using chamber-specific cards specific to a particular chamber when the player mover is in the particular chamber and discarding any unused chamber-specific cards specific to the particular chamber when the player mover leaves the particular chamber.

7. The method of claim 1 wherein each of the chamber-specific cards bears chamber-identifying indicia.

8. The method of claim 1 wherein each set of chamber-specific cards includes at least three different types of chamber-specific cards.

9. A method of playing a game comprising:
providing a pathway made up of a plurality of spaces;
providing first and second chambers through which the pathway travels, each chamber including a portion of the pathway, a start space, and a plurality of snare spaces;
providing a differentiable set of chamber-specific cards for each chamber;
providing a random number generator capable of indicating the number of spaces to move and whether or not a card is to be drawn;
providing a player mover for each player;
all players initially placing their player movers in the start space in the first chamber;
rolling the die;
moving the player mover the number of spaces indicated by the die or, if the die indicates that a card is to be drawn, drawing a card from the set of chamber-specific cards corresponding to the chamber in which the player mover is located;
if the player mover lands on a snare space, returning the player mover to the start space corresponding to the chamber in which the snare space was located.

10. The method of claim 9 wherein each set of cards includes a safe card, a danger card and an exchange card, the method further comprising:
returning the player mover to the start space corresponding to the chamber in which the player mover is located if a danger card is drawn;
exchanging the places of two player movers if an exchange card is drawn; and
allowing a player to avoid returning his or her player mover to the start space if the player has a safe card in his or her possession.

11. The method of claim 9 further comprising discarding any chamber-specific cards not corresponding to the chamber in which a player mover is currently located.

12. A game comprising:
rules for playing the game;
a plurality of chambers;
a pathway including a plurality of spaces, the pathway beginning in a first chamber and ending in a second chamber;
a start space for each chamber, each start space bearing indicia identifying the start space as a start space;
a plurality of snare spaces for each chamber;
a differentiable set of chamber-specific skill cards for each chamber;
a player mover for each player; and
a random number generator;
wherein each set of chamber-specific cards includes at least three different types of chamber-specific cards.

13. The game of claim 12 wherein each type of card provides different instructions from the other types.

14. A game comprising:
rules for playing the game;
a plurality of chambers;
a pathway including a plurality of spaces, the pathway beginning in a first chamber and ending in a second chamber;
a start space for each chamber, each start space bearing indicia identifying the start space as a start space;
a plurality of snare spaces for each chamber;
a differentiable set of chamber-specific skill cards for each chamber;
a player mover for each player; and
a random number generator;
wherein each chamber-specific card bears chamber-identifying indicia.

15. A game comprising:
rules for playing the game;
a plurality of chambers;
a pathway including a plurality of spaces, the pathway beginning in a first chamber and ending in a second chamber;
a start space for each chamber, each start space bearing indicia identifying the start space as a start space;
a plurality of snare spaces for each chamber;
a differentiable set of chamber-specific skill cards for each chamber;
a player mover for each player; and
a random number generator;
wherein the pathway traverses a third chamber.

* * * * *